United States Patent Office 3,652,519
Patented Mar. 28, 1972

3,652,519
ALTERNATING COPOLYMERS OF BUTADIENE
AND α-OLEFINE AND A PROCESS FOR THEIR
PREPARATION
Akihiro Kawasaki, Ichihara-shi, Hiroaki Ueda, Chiba-shi, and Isao Maruyama, Ichihara-shi, Japan, assignors to Maruzen Petrochemical Co., Ltd., Tokyo, Japan
Filed Dec. 12, 1969, Ser. No. 884,479
Claims priority, application Japan, Dec. 21, 1968,
43/93,503, 43/93,504
Int. Cl. C08d 3/02
U.S. Cl. 260—85.3          10 Claims

ABSTRACT OF THE DISCLOSURE

Alternating copolymers of butadiene and α-olefine of the formula $CH_2=CHR$ wherein R is $C_1$–$C_4$ alkyl or phenyl are formed by reaction in the presence of a catalyst comprising an organoaluminum compound and certain vanadium chlorides or oxychlorides. When styrene is used, the copolymer has an intrinsic viscosity greater than 0.1 dl./g. in chloroform at 30° C.; otherwise the copolymers have an intrinsic viscosity not greater than 0.1 dl./g., measured similarly.

BACKGROUND OF THE INVENTION

Figure 1:
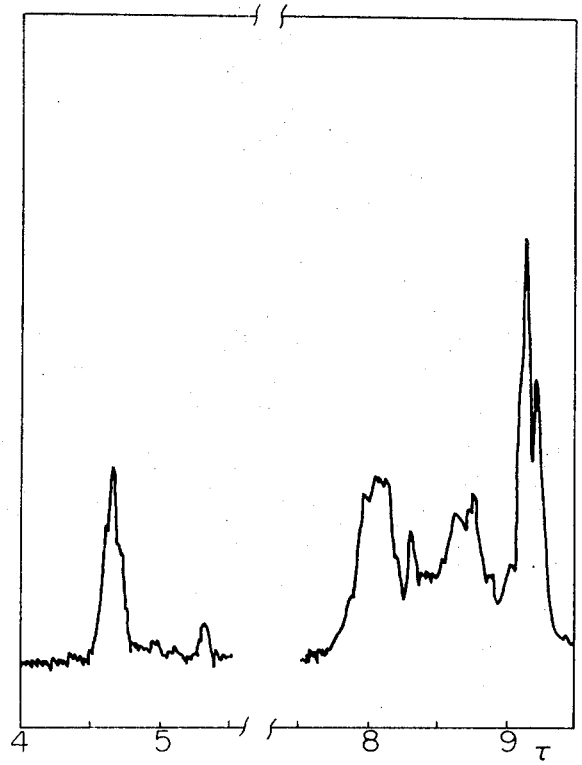

The present invention relates to new alternating copolymers of butadiene and α-olefine and to a process for their preparation.

Because it is easily chipped and cut and has low skid resistance, the demand for cis-1.4 polybutadiene in the field of automobile tire is not so large as was expected at first. The defects have been ascribed to its unbranched straight-chain structure.

In order to overcome these defects, many attempts have been made to produce alternating copolymers of butadiene and α-olefine, for example, butadiene and propylene, butadiene and 1-butene, etc. However, in general, it is not easy to produce even a random copolymer of butadiene and α-olefine by an ionic catalyst.

For instance, German Pat. 1,173,254 claims the process for preparing a copolymer of conjugated diene and monoolefine using vanadium (V) oxychloride as the catalyst, but no example is shown of a copolymerization reaction of butadiene and propylene. German Pat. 1,144,924 claims the process for preparing a copolymer of diene and ethylene or propylene by using the catalyst system consisting of a compound of Ti, Zr, Ce, V, Nb, Ta, Cr, Mo or W in which the metal is at least in part below a valency of 3. This patent gives examples of the copolymerization reaction of butadiene and ethylene by titanium tetrachloride - phenylmagnesiumbromide, titanium tetrachloride - lithium - aluminumhydride, titanium tetrachloride-sodium dispersion, zirconium tetrachloride-tintetrabutyl and tetraoctyltitanate-phenylmagnesiumbromide catalyst systems but no example of a process for preparing a copolymer of butadiene and propylene is shown. Belgium Pat. 625,657 also describes the process for preparing co- and terpolymers of butadiene with ethylene and(or) α-olefines by using the catalyst system containing a hydrocarbon soluble vanadium compound and an organoaluminum compound of more than one organic group having strong sterical hindrance, e.g. 3-methyl-butyl, cycloalkyl or cyclopentylmethyl and it claims the process for preparing ethylene-propylene-butadiene terpolymer. However, no example of butadiene-propylene copolymer is shown in it.

On the other hand, British Pat. 1,108,630 shows the process for preparing a rubbery random copolymer of butadiene and propylene by using the three components catalyst system consisting of a trialkylaluminum, iodine and a compound having the general formula of

wherein $n$ is zero or an integer of 1 to 4. A random copolymer of butadiene and propylene was also prepared by using the catalyst system consisting of triethylaluminum, titanium tetrachloride and polypropylene oxide. Polypropylene oxide was used as a randomizer and therefore a copolymer of butadiene and propylene prepared by the catalyst system of triethylaluminum and titanium tetrachloride was shown to be block-type. (Paper presented at 2nd Symposium on Polymer Synthesis, Tokyo, Oct. 5, 1968, The Society of Polymer Science, Japan.) British Pat. 1,026,615 claims the process for preparing a random copolymer of butadiene and propylene by forming the catalyst system of triethylaluminum and titanium tetrachloride in the presence of propylene, and then adding butadiene to the catalyst system. According to the patent, the propylene content of the copolymer was much higher than that of the copolymer prepared by the catalyst formed after the monomers were mixed. This result is inconsistent with the result described in the above paper. A copolymerization reaction of butadiene and propylene was also carried out by using the catalyst system of triethylaluminum and titanium tetrachloride prepared in propylene and the product was confirmed to be a copolymer of butadiene and propylene by fractional precipitation test (Chemistry of High Polymers, The Society of Polymer Science, Japan, 20, 461 (1963)). The content of this paper corresponds to that of the above British patent, but no description to the effect that the copolymer should be a random copolymer of butadiene and propylene is shown in it.

According to the method of British Pat. 982,708, a mixture containing 80–95 mole percent butadiene, the rest being 4-methyl-1-pentene, is polymerized at a temperature in the range 0° to 30° C. by the catalyst system which is the reaction product of vanadium (V) oxychloride with triisobutylaluminum, an aluminumdialkyl monochloride or an aluminum sesquialkyl chloride. The microstructure of the copolymer is not shown in the patent. British Pat. 924,654 describes the process for preparing a copolymer of butadiene and propylene by using an "Alfin" catalyst. The copolymer showed a characteristic infra-red absorption band at 11.95 microns. It was ascribed to trisubstituted ethylene structure. Therefore, the result does not support the assumption that the copolymer should be a random or alternating copolymer of butadiene and propylene.

Consequently, as far as the inventors know, there is no prior art in connection with alternating copolymers of butadiene and α-olefine and the process for preparation thereof.

SUMMARY OF THE INVENTION

In accordance with this invention, it has been discovered that by using an organoaluminum compound-vanadium (IV) chloride,
an organoaluminum compound-vanadium (V) oxychloride,
an organoaluminum compound-vanadium (IV) chloride-an organic peroxide compound,
an organoaluminum compound-vanadium (V) oxychloride-an organic peroxide compound,
an organoaluminum compound-vanadium (IV) chloride-chromium (VI) oxychloride or
an organoaluminum compound-vanadium (V) oxychloride-chromium (VI) oxychloride catalyst system, alternating copolymers of butadiene and α-olefine can be produced. The new alternating copolymers of this invention are in general rubber-like in character and may be used as polymeric plasticizers, in adhesives and may be vulcanized with sulfur or a sulfur compound to produce vulcanized elastomers.

Although, contrary to our expectation the microstructure of butadiene units of all of these alternating copolymers were trans 1.4-configuration, the glass transition temperature of these copolymers was very low and they showed rubber-like elasticity. The result coincides with that of the alternating copolymer of butadiene and acrylonitrile (J. Polymer Sci., Part B, 7, 411 (1969)). The microstructure of butadiene unit of the copolymer was trans 1.4-configuration, but the copolymer also showed rubber-like elasticity.

The organoaluminum compounds which form one component of the catalyst of this invention may be defined by the formula $AlR_nCl_{3-n}$ where R is a hydrocarbon radical such as alkyl radical, aryl radical or cycloalkyl radical and $n$ is a number from 2 to 3. Organic peroxide compounds forming the other component of the catalyst of this invention are those known in the art, e.g., benzoyl peroxide, cumene hydroperoxide, peroxidized butyl ether or tert-butyl hydroperoxide. In the preferred embodiment the molar ratio of an organoaluminum compound to vanadium (IV) chloride or vanadium (V) oxychloride should be higher than 0.5 ($AlR_nCl_{3-n}/VCl_4 > 0.5$ or $AlR_nCl_{3-n}/VOCl_3 > 0.5$).

The α-olefine should be one having the following general formula:

$$CH_2=CHR$$

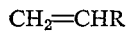

wherein R may be a normal chain or branched chain lower alkyl group or a phenyl group.

Preparation of the alternating copolymer of butadiene and α-olefine is carried out by contacting butadiene with α-olefine in liquid phase in the presence of the catalyst system described above. The copolymerization reaction is generally carried out in the presence of a liquid organic diluent. Suitable diluent that can be used for the copolymerization reaction is a hydrocarbon, such as heptane, octane, isooctane, benzene, toluene, etc. The temperature of the copolymerization reaction may be varied from $-100°$ C. to $50°$ C. and sufficient pressure is employed to keep the monomers in liquid phase. The molar ratio of butadiene to α-olefine in the initial monomer composition may be from 20:80 to 80:20 and more usually is 50:50.

At the completion of the copolymerization reaction the product is precipitated and deashed with the aid of a methanol-hydrochloric acid mixture. The precipitated product is washed with methanol several times and dried under vacuum. Thereafter the product is extracted with diethyl ether or with methyl ethyl ketone. The diethyl ether or methyl ethyl ketone soluble fraction is collected as an alternating copolymer of butadiene and α-olefine.

DESCRIPTION OF THE PREFERRED EMBODIMENTS

The following examples illustrate the new alternating copolymers of butadiene and α-olefine and the process for preparation thereof in accordance with this invention.

Examples 1 and 2

In these examples, the usual, dry, air-free technique was employed and varying amounts of diluent, a mixture of 3 milliliters liquid propylene and 3-milliliters toluene, 3 milliliters liquid butadiene, 1.02 milliliters vanadium (V) oxychloride solution in toluene (1 molar solution), 2.55 milliliters triethylaluminum solution in toluene (1 molar solution) and varying amounts of benzoyl peroxide solution in toluene (0.5 molar solution) were put successively in a 25 milliliters glass bottle held in a low temperature bath at $-78°$ C. The amounts of diluent and each solution of individual catalyst component are set forth in Table 1 in milliliters. Thereafter the bottle was sealed and allowed to copolymerize at $-30°$ C. for 22 hours. Methyl ethyl ketone soluble fraction was collected as an alternating copolymer. The copolymers showed tacky and rubber-like properties.

The following results support the conclusion that the copolymer should be an alternating copolymer of butadiene and propylene.

(1) The composition of the copolymer according to the NMR analysis substantially agrees well with the calculated value for the 1:1 copolymer of butadiene and propylene. Copolymer compositions were determined by measuring the ratio of peak area at $4.65\tau$ of butadiene unit to that of doublet at $9.11\tau$ and $9.20\tau$ of propylene unit.

(2) The copolymerization reaction gives 1:1 copolymer over a wide range of initial monomer composition.

(3) The copolymerization reaction gives 1:1 copolymer independently of polymerization time.

(4) Although the microstructure of butadiene unit in the copolymer is trans 1.4-configuration, the crystallization sensitive bands of trans 1.4 polybutadiene at 1335 cm.$^{-1}$, 1235 cm.$^{-1}$, 1121 cm.$^{-1}$, 1054 cm.$^{-1}$ and 773 cm.$^{-1}$ do not appear in its infra-red spectrum. This means at least that the length of the butadiene-butadiene repeating unit of the copolymer is not so long as to be detected by its infra-red spectrum.

(5) The 1155 cm.$^{-1}$ band of propylene homopolymer is not shown in its infra-red spectrum and a new broad band appears at 1065 cm.$^{-1}$. This means at least that the length of propylene-propylene repeating unit of the copolymer is not so long as to be detected by its infra-red spectrum.

(6) Two new bands at 890 cm.$^{-1}$ and 1640 cm.$^{-1}$ are observed in its infra-red spectrum. The 890 cm.$^{-1}$ band may be ascribed to the CH out of plane vibration mode of the terminal $CH_3-C'=CH_2$ group of the copolymer and the 1640 cm.$^{-1}$ band may also be ascribed to the $C=C$ stretching mode of the group.

(7) The absorption band at 967 cm.$^{-1}$ corresponding to the CH out of plane deformation mode of trans 1.4 polybutadiene shifts to the high frequency side by about 5 cm.$^{-1}$. This result suggests the existence of butadiene-propylene unit in the copolymer.

Figure 2:
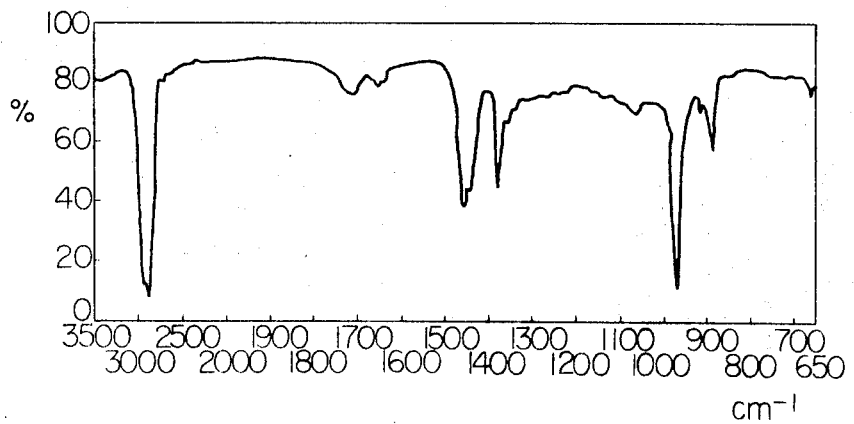

FIG. 1 shows the NMR spectrum of the alternating copolymer of butadiene and propylene. FIG. 2 shows the infra-red spectrum of the alternating copolymer.

Examples 3 and 4

In these examples, the usual, dry, air-free technique was employed and varying amounts of diluent, 1.02 milliliters vanadium (V) oxychloride solution in toluene (1 molar solution), varying amounts of organoaluminum solution in toluene, a mixture of 3 milliliters liquid propylene and 3 milliliters toluene, 3 milliliters liquid butadiene and 2.04 milliliters benzoyl peroxide solution in toluene (0.5 molar solution) were put successively in a 25 milliliters glass bottle held in a low temperature bath at $-78°$ C. The amounts of diluent and each solution of individual catalyst component are set forth in Table 2 in milliliters. Thereafter the bottle was sealed and allowed to copolymerize at $-30°$ C. for 24 or 2 hours. Methyl ethyl ketone soluble fraction was collected as an alternating copolymer. The results are summarized in Table 2. The copolymers showed tacky and rubber-like properties.

Examples 5 and 6

In these examples, the usual, dry, air-free technique was employed and varying amounts of diluent, vanadium (V) oxychloride solution in toluene (1 molar solution) and organoaluminum compound solution in toluene were put successively in a 25 milliliters glass bottle held in a low temperature bath at $-78°$ C. Then the bottle was held in a constant temperature bath at $25°$ C. for 10 minutes. Thereafter the bottle was twice again held in a low temperature bath at $-78°$ C. and a mixture of 2 milliliters liquid propylene and 4 milliliters toluene or 2.5 milliliters liquid 1-butene and 2 milliliters liquid butadiene were put successively into the bottle also employing the usual, dry, air-free technique. The amounts of diluent and each solution of individual catalyst component are set forth in Table 3 in milliliters. Thereafter the bottle was sealed and allowed to copolymerize at −30° C. for 45 or 42 hours. Methyl ethyl ketone soluble fraction was collected as an alternating copolymer. The results are summarized in Table 3. The copolymers showed tacky and rubber-like properties.

Examples 7–10

In these examples, the usual, dry, air-free technique was employed and varying amounts of diluent, 0.084 milliliter chromium (VI) oxychloride, 1.05 milliliters vanadium (V) oxychloride solution in toluene, varying amounts of organoaluminum compound solution in toluene, a mixture of 2-milliliters liquid propylene and 2-milliliters toluene and 2 milliliters liquid butadiene were put successively in a 25 milliliters glass bottle held in a low temperature bath at −78° C. The amounts of diluent and each solution of individual catalyst component are set forth in Table 4 in milliliters. Thereafter the bottle was sealed and allowed to copolymerize at −30° C. for 18 or 0.5 hour. Methyl ethyl ketone soluble fraction was collected as an alternating copolymer except in Example 9 where a diethyl ether soluble fraction was collected as an alternating copolymer. The results are summarized in Table 4. The copolymer showed tacky and rubber-like properties.

Examples 11–13

In these examples, the usual, dry, air-free technique was employed and 3 milliliters toluene, 1.05 milliliters vanadium (V) oxychloride solution in toluene (1 molar solution), varying amounts of organoaluminum compound solution in toluene, a mixture of 2 milliliters liquid propylene and 2 milliliters toluene and 2 milliliters liquid butadiene were put successively in a 25 milliliters glass bottle held in a low temperature bath at −78° C. The amounts of each solution of individual catalyst component are set forth in Table 5 in milliliters. Thereafter the bottle was sealed and allowed to copolymerize at −30° C. for 18 or 45 hours. Methyl ethyl ketone soluble fraction was collected as an alternating copolymer except in Example 12 where a diethyl ether soluble fraction was collected as an alternating copolymer. The results are summarized in Table 5. The copolymers showed tacky and rubber-like properties.

Examples 14–16

In these examples, the usual, dry, air-free technique was employed and varying amounts of diluent, 0.084 milliliter chromium (VI) oxychloride, 1.05 milliliters vanadium (V) oxychloride solution in toluene (1 molar solution), varying amounts of organoaluminum compound solution in toluene, 2.5 milliliters liquid 1-butene and 2 milliliters liquid butadiene were put successively in a 25 milliliters glass bottle held in a low temperature bath at −78° C. The amounts of diluent and each solution of individual catalyst component are set forth in Table 6 in milliliters. Thereafter the bottle was sealed and allowed to copolymerize at −30° C. for 15.5 hours. Methyl ethyl ketone soluble fraction was collected as an alternating copolymer except in Example 14 where a diethyl ether soluble fraction was collected as an alternating copolymer. The results are summarized in Table 6. The copolymers showed tacky and rubber-like properties.

The following results support the conclusion that the copolymer should be an alternating copolymer of butadiene and 1-butene.

(1) The composition of the copolymer according to the NMR analysis substantially agrees well with the calculated value for the 1:1 copolymer of butadiene and 1-butene. Copolymer compositions were determined by measuring the ratio of peak area at 4.65τ of butadiene unit to that of doublet at 9.06τ and 9.15τ of 1-butene unit.

(2) The copolymerization reaction gives 1:1 copolymer over a wide range of initial monomer composition.

(3) The copolymerization reaction gives 1:1 copolymer independently of polymerization time.

(4) Although the microstructure of butadiene unit in the copolymer is trans 1.4-configuration, the crystallization sensitive bands of trans 1.4 polybutadiene at 1335 cm.$^{-1}$, 1235 cm.$^{-1}$, 1121 cm.$^{-1}$, 1054 cm.$^{-1}$ and 773 cm.$^{-1}$ do not appear in its infra-red spectrum.

(5) A new band appears at 1065 cm.$^{-1}$. The band corresponds to the 1065 cm.$^{-1}$ band of the alternating copolymer of butadiene and propylene.

(6) The absorption band at 967 cm.$^{-1}$ corresponding to the CH out of plane deformation mode of trans 1.4 polybutadiene shifts to the high frequency side by about 5 cm.$^{-1}$.

Figure 3:
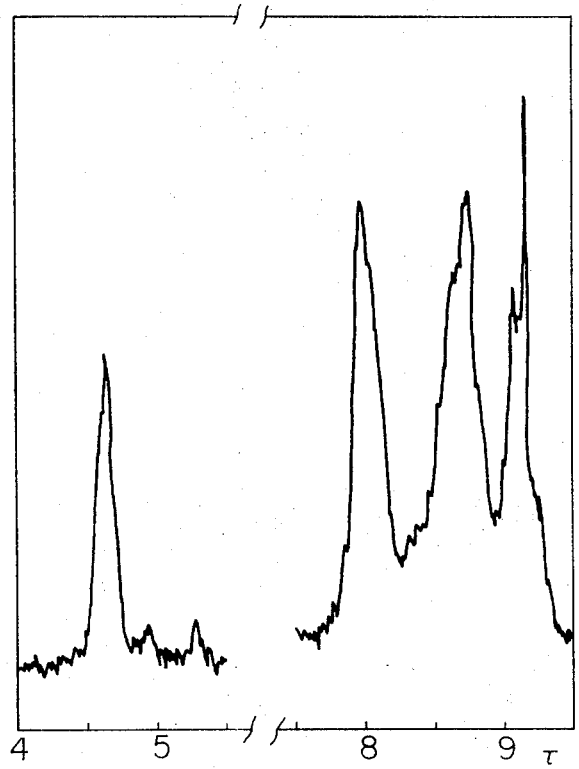
Figure 4:
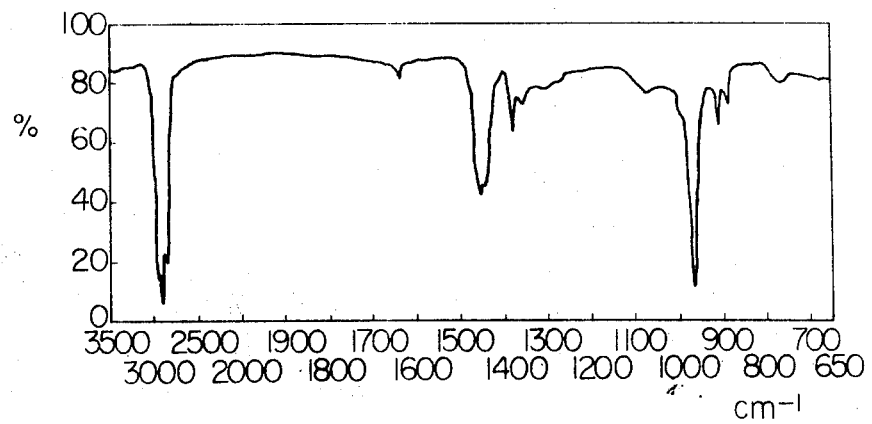

FIG. 3 shows the NMR spectrum of the alternating copolymer of butadiene and 1-butene. FIG. 4 shows the infra-red spectrum of the alternating copolymer.

Examples 17–19

In these examples, the usual, dry, air-free technique was employed and varying amounts of diluent, 2.1 milliliters benzoyl peroxide solution in toluene (0.5 molar solution), 1.05 milliliters vanadium (V) oxychloride solution in toluene (1 molar solution) and varying amounts of organoaluminum compound in toluene were put successively in a 25 milliliters glass bottle held in a low temperature bath at −78° C. Then the bottle was held in a constant temperature bath at 25° C. for 10 minutes. Thereafter the bottle was twice again held in a low temperature bath at −78° C. and 2.5 milliliters liquid 1-butene and 2 milliliters liquid butadiene were put successively into the bottle also employing the usual, dry, air-free technique. The amounts of diluent and each solution of individual catalyst component are set forth in Table 7 in milliliters. Thereafter the bottle was sealed and allowed to copolymerize at −30° C. for 42 hours. Methyl ethyl ketone soluble fraction was collected as an alternating copolymer except in Example 17 where a diethyl ether soluble fraction was collected as an alternating copolymer. The results are summarized in Table 7. The copolymers showed tacky and rubber-like properties.

Examples 20–22

In these examples, the usual, dry, air-free technique was employed and 5 milliliters toluene, 105 milliliters vanadium (V) oxychloride solution in toluene (1 molar solution), varying amounts of organoaluminum compound solution in toluene, 2.5 milliliters liquid 1-butene and 2 milliliters liquid butadiene were put successively in a 25 milliliters glass bottle held in a low temperature bath at −78° C. Thereafter the bottle was sealed and allowed to copolymerize at −30° C. for 15.5 hours. Methyl ethyl ketone soluble fraction was collected as an alternating copolymer except in Example 20 where a diethyl ether soluble fraction was collected as an alternating copolymer. The amounts of each solution of individual catalyst component are set forth in Table 8 in milliliters and the results are also summarized in Table 8. The copolymers showed tacky and rubber-like properties.

Examples 23–25

The usual, dry, air-free technique was employed and varying amounts of diluent, 2.1 milliliters benzoyl peroxide solution in toluene (0.5 molar solution) or 0.08 milliliter chromium (VI) oxychloride, varying amounts of vanadium (V) oxychloride solution in toluene (1 molar solution) and 2.6 milliliters triisobutylaluminum solution in toluene (1 molar solution) were put successively in a 25 milliliters glass bottle held in a low temperature bath at −78° C. Then the bottle was held in a constant temperature bath at 25° C. for 10 minutes. Thereafter the bottle was twice again held in a low temperature bath at −78° C. and 3 milliliters styrene and 2 milliliters liquid butadiene were put successively in the bottle. The amounts of diluent and each solution of individual catalyst component are set forth in Table 9. Then the bottle was sealed and allowed to copolymerize at −30° C. for 45 or 17 hours. The reaction product was extracted with diethyl ether and the diethyl ether soluble fraction was collected as an alternating copolymer of butadiene and styrene. These copolymers were rubber-like elastomers. The results are summarized in Table 9.

The following results support the conclusion that the copolymer should be an alternating copolymer of butadiene and styrene.

(1) The composition of the copolymer according to the NMR analysis substantially agrees well with the calculated value for the 1:1 copolymer of butadiene and styrene.

(2) The copolymerization reaction gives 1:1 copolymer independently of polymerization time.

(3) The NMR spectrum of the copolymer shows a strong peak at $8.03\tau$ which is ascribed to the methylene groups of butadiene-styrene repeating unit, but the $7.95\tau$ peak ascribed to the methylene groups of trans 1.4 polybutadiene appears as a very weak peak. The result substantially deny the existence of butadiene-butadiene repeating unit.

100 parts by weight of the alternating copolymer of butadiene and styrene prepared by the method of Example 25 was mixed on a laboratory roll mixer, with 2 parts of sulphur, 5 parts of zinc oxide, 1 part of tetramethyl thiuram disulfide, 1 part of 2,5-di-tert-butyl hydroquinone and 40 parts of HAF carbon black. The mixture thus obtained was vulcanized in a press for 20 minutes at 140° C. Tensile strength of the sample was 150 kg./cm.$^2$.

Figure 5:
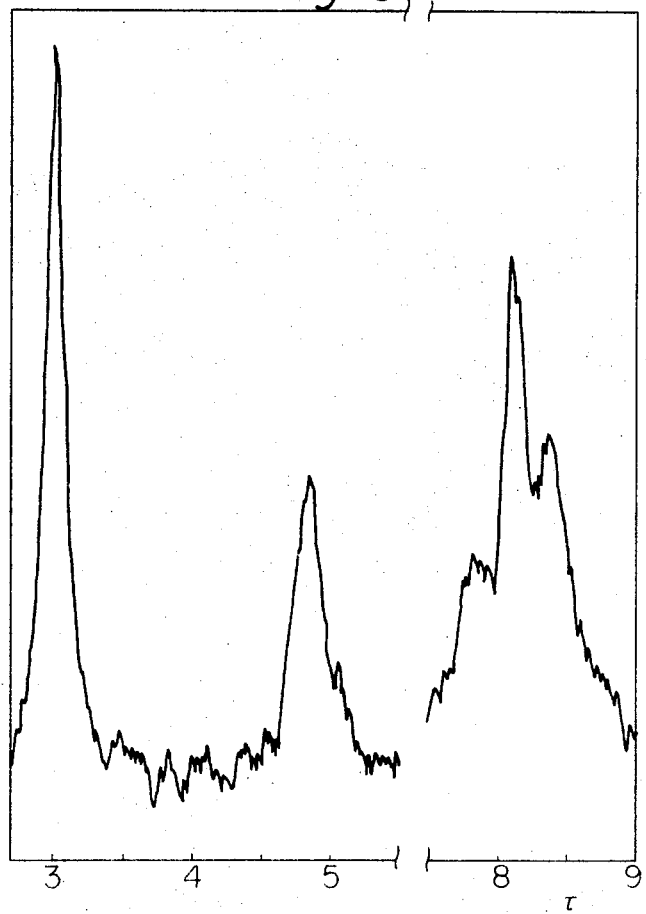
Figure 6:
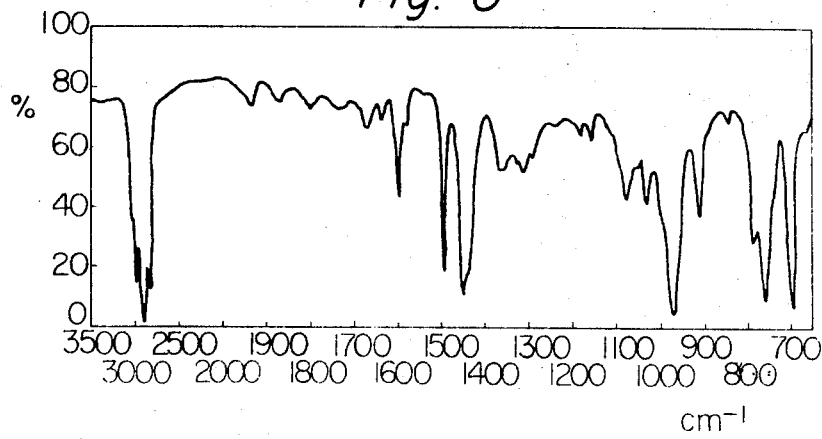

FIG. 5 shows the NMR spectrum of the alternating copolymer of butadiene and styrene. FIG. 6 shows the infrared spectrum of the alternating copolymer.

Examples 26–28

In these examples, the usual, dry, air-free technique was employed and varying amounts of diluent and 1.05 milliliters vanadium (IV) chloride solution in toluene (1 molar solution) were put in a 25 milliliters glass bottle at 25° C. Then the bottle was held in a low temperature bath at −78° C. and varying amounts of organoaluminum compound solution in toluene and 2.10 milliliters benzoyl peroxide solution in toluene (0.5 molar solution) were put in the bottle. Then the bottle was held in a constant temperature bath at 25° C. for 10 minutes. Thereafter the bottle was twice again held in a low temperature bath at −78° C. and a mixture of 2 milliliters liquid propylene and 2 milliliters toluene and 2 milliliters liquid butadiene were put successively into the bottle also employing the dry, air-free technique. The amounts of diluent and each solution of individual catalyst component are set forth in Table 10 in milliliters. Thereafter the bottle was sealed and allowed to copolymerize at −30° C. for 96 hours. Methyl ethyl ketone soluble fraction was collected as an alternating copolymer except in Example 26 where a diethyl ether soluble fraction was collected as an alternating copolymer. The results are summarized in Table 10.

Examples 29–31

In these examples, the usual, dry, air-free technique was employed and varying amounts of diluent, 0.084 milliliter chromium (VI) oxychloride, 0.11 milliliter vanadium (IV) chloride, varying amounts of organoaluminum compound solution in toluene, a mixture of 2 milliliters liquid propylene and 2 milliliters toluene and 2 milliliters liquid butadiene were put successively in a 25 milliliters glass bottle held in a low temperature bath at −78° C. The amounts of diluent and each solution of individual catalyst component are set forth in Table 11 in milliliters. Thereafter the bottle was sealed and allowed to copolymerize at −30° C. for 15.5 hours. Methyl ethyl ketone soluble fraction was collected as an alternating copolymer except in Example 30 where a diethyl ether soluble fraction was collected as an alternating copolymer. The results are summarized in Table 11.

Examples 32–34

In these examples, the usual, dry, air-free technique was employed and 6 milliliters diluent, 0.11 milliliter vanadium (IV) chloride, varying amounts of organoaluminum compound solution in toluene, a mixture of 2 milliliters liquid propylene and 2 milliliters toluene or 2.5 milliliters liquid 1-butene and 2 milliliters liquid butadiene were put successively in a 25 milliliters glass bottle held in a low temperature bath at −78° C. The amounts of diluent and each solution of individual catalyst component are set forth in Table 12 in milliliters. Thereafter the bottle was sealed and allowed to copolymerize at −30° C. for 15.5 or 19 hours. Methyl ethyl ketone soluble fraction was collected as an alternating copolymer except in Example 33 where a diethyl ether soluble fraction was collected as an alternating copolymer. The results are summarized in Table 12.

Examples 35–37

In these examples, the usual, dry, air-free technique was employed and varying amounts of diluent, 0.084 milliliter chromium (VI) oxychloride, 0.11 milliliter vanadium (IV) chloride, varying amounts of organoaluminum compound solution in toluene, 2.5 milliliters liquid 1-butene and 2 milliliters liquid butadiene were put successively in a 25 milliliter glass bottle held in a low temperature bath at −78° C. The amounts of diluent and each solution of individual catalyst component are set forth in Table 13 in milliliters. Thereafter the bottle was sealed and allowed to copolymerize at −30° C. for 17 hours. Methyl ethyl ketone soluble fraction was collected as an alternating copolymer except in Example 35 where a diethyl ether soluble fraction was collected as an alternating copolymer. The results are summarized in Table 13.

Examples 38–40

In these examples, the usual, dry, air-free technique was employed and varying amounts of diluent, 0.1 milliliter vanadium (IV) chloride and varying amounts of organoaluminum compound solution in toluene were put successively in a 25 milliliters glass bottle held in a low temperature bath at −78° C. The amounts of diluent and each solution of individual catalyst component are set forth in Table 14 in milliliters. After the addition of the catalyst, the bottle was held in a constant temperature bath at 25° C. for 10 minutes. Thereafter the bottle was twice again held in a low temperature bath at −78° C. and 2.5 milliliters liquid 1-butene and 2 milliliters liquid butadiene were put successively into the bottle also employing the usual, dry, air-free technique. Then the bottle was sealed and allowed to copolymerize at −30° C. for 19 hours. Methyl ethyl ketone soluble fraction was collected as an alternating copolymer except in Example 38 where a diethyl ether soluble fraction was collected as an alternating copolymer. The results are summarized in Table 14.

Examples 41–43

In these examples, the usual, dry, air-free technique was employed and varying amounts of diluent, 2.1 milliliters benzoyl peroxide solution in toluene (0.5 molar solution), 0.1 milliliter vanadium (IV) chloride and varying amounts of organoaluminum compound solution in toluene were put successively in a 25 milliliters glass bottle held in a low temperature bath at −78° C. The amounts of diluent and each solution of individual catalyst component are set forth in Table 15 in milliliters. After the addition of the catalyst, the bottle was held in a constant temperature bath at 25° C. for 10 minutes. Thereafter the bottle was twice again held in a low temperature bath at −78° C. and 2.5 milliliters liquid 1-butene and 2 milliliters liquid butadiene were put successively into the bottle also employing the usual, dry, air-free technique. Then the bottle was sealed and allowed to copolymerize at −30° C. for 19 hours. Methyl ethyl ketone soluble fraction was collected as an alternating polymer except in Example 41 where a diethyl ether soluble fraction was collected as an alternating copolymer. The results are summarized in Table 15.

Examples 44–46

In these examples, the usual, dry, air-free technique was employed and 6 milliliters toluene, 2.1 milliliters benzoyl peroxide solution in toluene (0.5 molar solution), 0.1 milliliter vanadium (IV) chloride and 2.6 milliliters triisobutylaluminum solution in toluene (1 molar solution) were put successively in a 25 milliliters glass bottle held in a low temperature bath at −78° C. Then the bottle was held in a constant temperature bath at 25° C. for 10 minutes. Thereafter the bottle was twice again held in a low temperature bath at −78° C. and varying amounts of liquid α-olefine and 2 milliliters liquid butadiene were put successively into the bottle also employing the usual, dry, air-free technique. The amounts of each liquid 1-olefine are set forth in Table 16 in milliliters. Thereafter the bottle was sealed and allowed to copolymerize at −30° C. for 39 hours. Diethyl ether soluble fraction was collected as an alternating copolymer. The results are summarized in Table 16.

The copolymer of butadiene and 1-pentene shows the following results.

(1) The composition of the copolymer according to the NMR analysis substantially agrees well with the calculated value for the 1:1 copolymer of butadiene and 1-pentene.

(2) The copolymerization reaction gives 1:1 copolymer over a wide range of initial monomer composition.

(3) The copolymerization reaction gives 1:1 copolymer independently of polymerization time.

(4) A new broad band ascribed to neither trans 1.4 polybutadiene nor poly 1-pentene appears at 1065 cm.$^{-1}$ in the infra-red spectrum.

(5) The crystallization sensitive bands of trans 1.4 polybutadiene do not appear in the infra-red spectrum.

The copolymer of butadiene and 4-methyl-1-pentene shows the following results.

(1) The composition of the copolymer according to the NMR analysis substantially agrees well with the calculated value for the 1:1 copolymer of butadiene of 4-methyl-1-pentene.

(2) The copolymerization reaction gives 1:1 copolymer over a wide range of initial monomer composition.

(3) The copolymerization reaction gives 1:1 copolymer independently of polymerization time.

(4) A new broad band ascribed to neither trans 1.4 polybutadiene nor poly 4-methyl-1-pentene appears at 1065 cm.$^{-1}$ in the infra-red spectrum.

(5) The crystallization sensitive bands of trans 1.4 polybutadiene do not appear in the infra-red spectrum.

The copolymer of butadiene and 1-hexene also shows the following results.

(1) The composition of the copolymer according to the NMR analysis substantially agrees well with the calculated value for the 1:1 copolymer of butadiene and 1-hexene.

(2) The copolymerization reaction gives 1:1 copolymer over a wide range of initial monomer composition.

(3) The copolymerization reaction gives 1:1 copolymer independently of polymerization time.

(4) A new broad band ascribed to neither trans 1.4 polybutadiene nor poly 1-hexene appears at 1065 cm.$^{-1}$ in the infra-red spectrum.

(5) The crystallization sensitive bands of trans 1.4 polybutadiene do not appear in the infra-red spectrum.

From the above results, these copolymers are determined to be alternating copolymers.

Figure 7:
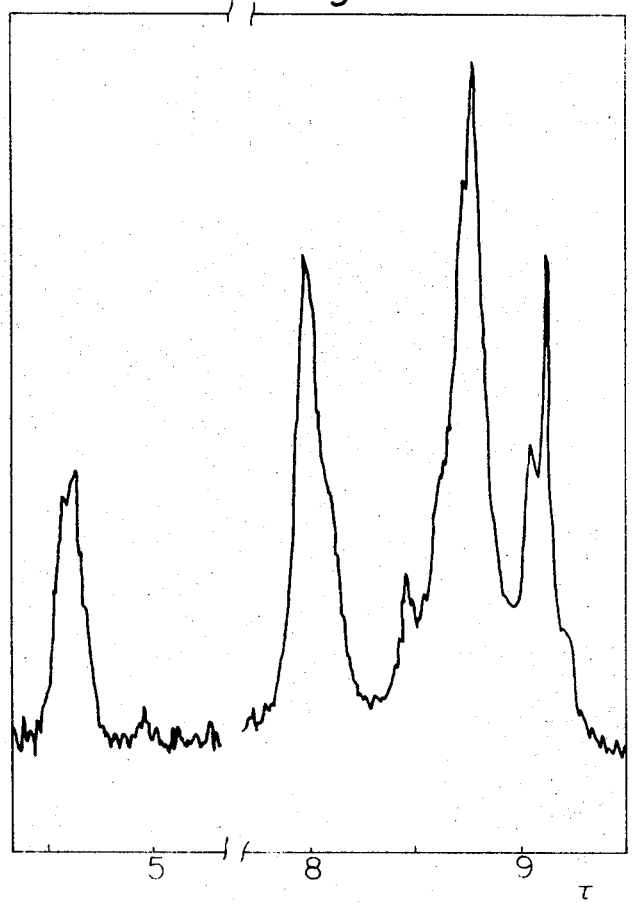
Figure 8:
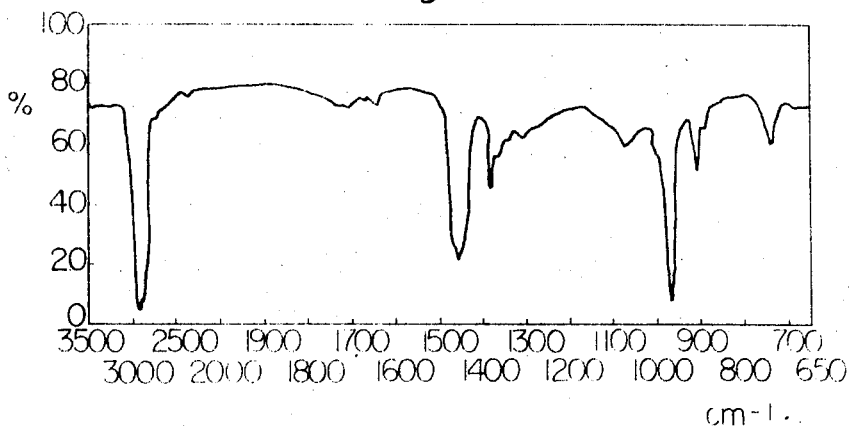
Figure 9:
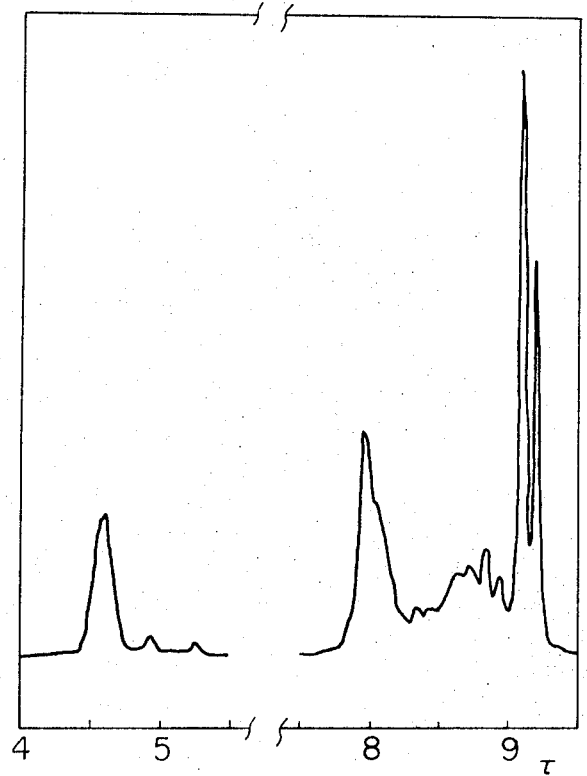
Figure 10:
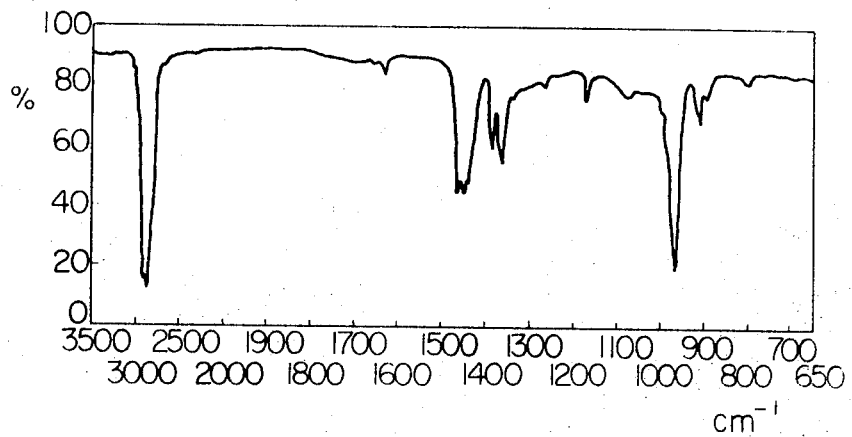
Figure 11:
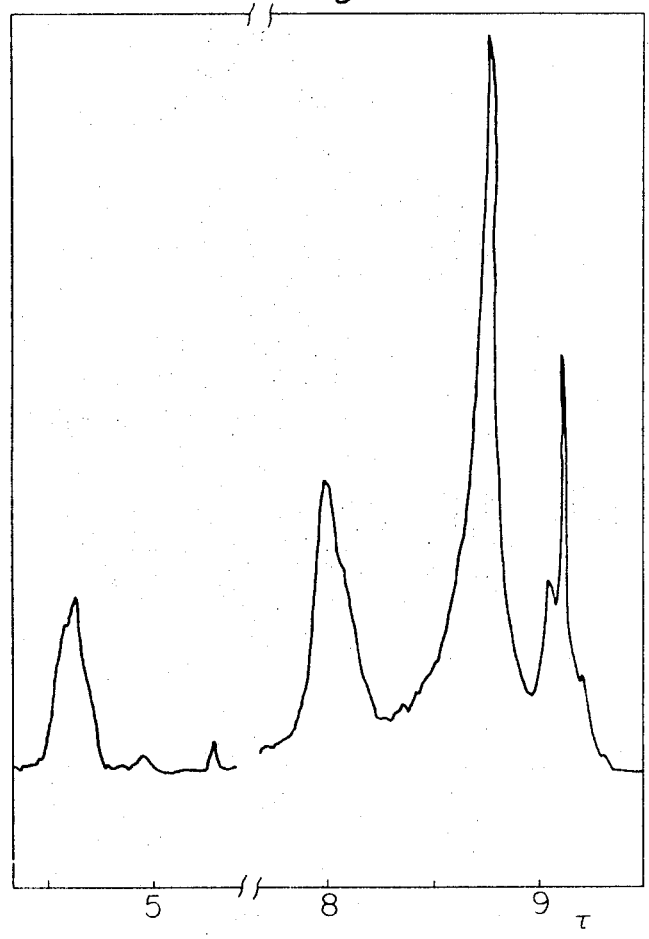
Figure 12:
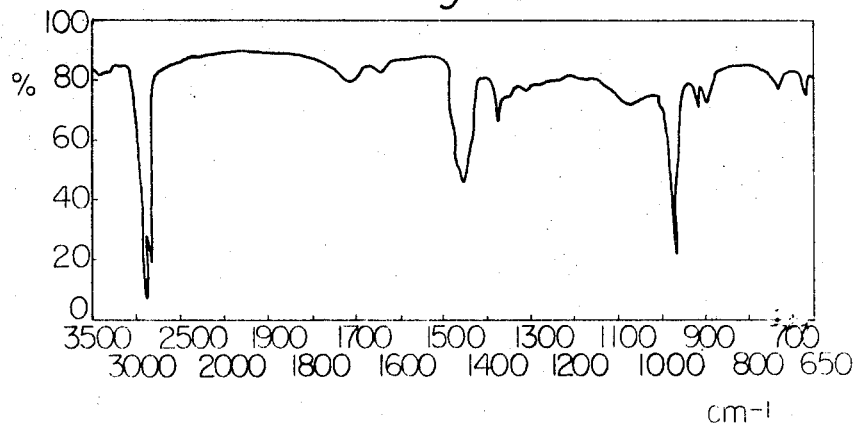

FIG. 7 shows the NMR spectrum of the alternating copolymer of butadiene and 1-pentene. FIG. 8 shows the infra-red spectrum of the alternating copolymer. FIG. 9 shows the NMR spectrum of the alternating copolymer of butadiene and 4-methyl-1-pentene. FIG. 10 shows the infra-red spectrum of the alternating copolymer. FIG. 11 shows the NMR spectrum of the alternating copolymer of butadiene and 1-hexene. FIG. 12 shows the infra-red spectrum of the alternating copolymer.

Examples 47–49

The usual, dry, air-free technique was employed and varying amounts of diluent, 2.1 milliliters benzoyl peroxide solution in toluene (0.5 molar solution) or 0.08 milliliter chromium (VI) oxychloride, varying amounts of vanadium (IV) chloride and 2.6 milliliters triisobutylaluminum solution in toluene (1 molar solution) were put successively in a 25 milliliters glass bottle held in a low temperature bath at −78° C. Then the bottle was held in a constant temperature bath at 25° C. for 10 minutes. Thereafter the bottle was twice again held in a low temperature bath at −78° C. and 3 milliliters styrene and 2 milliliters liquid butadiene were put successively in the bottle. The amounts of diluent and each solution of individual catalyst component are set forth in Table 17. Then the bottle was sealed and allowed to copolymerize at −30° C. for 45 hours or 17 hours. Diethyl ether soluble fraction was collected as an alternating copolymer. The results are summarized in Table 17. These copolymers were all rubber-like elastomers.

Example 50

The usual, dry, air-free technique was employed and 9.5 milliliters toluene, 0.1 milliliter vanadium (V) oxychloride solution in toluene (1 molar solution), 0.25 millimole chromium (VI) oxychloride, 1.0 milliliter triisobutylaluminum solution in toluene (1 molar solution) and a mixture of 2 milliliters liquid 1-butene and 2 milliliters liquid butadiene were put successively in a 25 milliliters glass bottle held in a low temperature bath at −78° C. Then the bottle was sealed and allowed to copolymerize at −30° C. for 16 hours. Diethyl ether soluble fraction was collected as an alternating copolymer. The yield was 1.73 g.

Example 51

The usual, dry, air-free technique was employed and 0.25 millimole benzoyl peroxide, 9.5 milliliters toluene, 0.1 milliliter vanadium (V) oxychloride solution in toluene (1 molar solution), 1.0 milliliter triisobutylaluminum solution in toluene (1 molar solution) and a mixture of 2 milliliters liquid 1-butene and 2 milliliters liquid butadiene were put successively in a 25 milliliters glass bottle held in a low temperature bath at −78° C. Then the bottle was sealed and allowed to copolymerize at −30° C. for 16 hours. Diethyl ether soluble fraction was collected as alternating copolymer. The yield was 1.53 g.

TABLE 1

| | Monomers [1] | | Diluent, toluene (ml.) | Catalysts [2] | | | Reaction conditions | | Alternating copolymer [3] | | |
|---|---|---|---|---|---|---|---|---|---|---|---|
| Ex. No. | Pr (ml.) | BD (ml.) | | VOCl$_3$ soln. (ml.) | AlEt$_3$ soln. (ml.) | B.P.O. soln. (ml.) | Temp. (° C.) | Time (hr.) | Yield (g.) | [η] (dl./g.) | Tg (° C.) |
| 1 | 3 | 3 | 3.5 | 1.02 | 2.55 | 0.11 | −30 | 22 | 1.42 | 0.1 | −74 |
| 2 | 3 | 3 | 2.5 | 1.02 | 2.55 | 1.10 | −30 | 22 | 1.71 | | |

[1] Pr: liquid propylene; BD: liquid butadiene.
[2] VOCl$_3$ soln.: 1 molar vanadium (V) oxychloride solution in toluene; AlEt$_3$ soln.: 1 molar triethylaluminum solution in toluene; B.P.O. soln.: 0.5 molar benzoyl peroxide solution in toluene.
[3] [η]: intrinsic viscosity in chloroform at 30° C.; Tg: glass transition temperature.

TABLE 2

| Example No. | Monomers[1] Pr (ml.) | Monomers[1] BD (ml.) | Diluent, toluene (ml.) | Catalysts[2] VOCl₃ soln. (ml.) | Catalysts[2] Organo-aluminum soln. (ml.) | B.P.O. soln. (ml.) | Reaction conditions Temp. (°C.) | Reaction conditions Time (hr.) | Alternating copolymer[3] Yield (g.) | Alternating copolymer[3] [η] (dl/g.) | Alternating copolymer[3] Tg (°C.) |
|---|---|---|---|---|---|---|---|---|---|---|---|
| 3 | 3 | 3 | 1.5 | 1.02 | AlEt₃ (2.55) | 2.04 | −30 | 24 | 1.72 | 0.1 | −73 |
| 4 | 3 | 3 |  | 1.02 | AlEt₂Cl (0.81) | 2.04 | −30 | 2 | 0.50 |  |  |

[1] Pr: liquid propylene; BD: liquid butadiene.
[2] VOCl₃ soln.: 1 molar vanadium (V) oxychloride solution in toluene; AlEt₃: 1 molar triethylaluminum solution in toluene; AlEt₂Cl: 5 molar diethylaluminum monochloride solution in toluene; B.P.O. soln.: 0.5 molar benzoyl peroxide solution in toluene.
[3] [η]: intrinsic viscosity in chloroform at 30° C.; Tg: glass transition temperature.

TABLE 3

| Ex. No. | Monomers[1] α-Olefine (ml.) | Monomers[1] BD (ml.) | Diluent, toluene (ml.) | Catalysts[2] VOCl₃ soln. (ml.) | Catalysts[2] Organo-aluminum soln. (ml.) | Reaction conditions Temp. (°C.) | Reaction conditions Time (hr.) | Alternating copolymer[3] Yield (g.) | Alternating copolymer[3] (η) (dl/g.) | Alternating copolymer[3] Tg (°C.) |
|---|---|---|---|---|---|---|---|---|---|---|
| 5 | Pr (2) | 2 | 5 | 0.52 | AlEt₂Cl (0.42) | −30 | 45 | 0.10 |  |  |
| 6 | 1-Bu (2.5) | 2 | 5 | 1.05 | AlEt₃ (2.62) | −30 | 42 | 0.25 | 0.1 | −75 |

[1] Pr: liquid propylene; 1-Bu: liquid 1-butene; BD: liquid butadiene.
[2] VOCl₃ soln.: 1 molar vanadium (V) oxychloride solution in toluene; AlEt₂Cl: 5 molar diethylaluminum monochloride solution in toluene; AlEt₃: 1 molar triethylaluminum solution in toluene.
[3] (η): intrinsic viscosity in chloroform at 30° C; Tg: glass transition temperature.

TABLE 4

| Example No. | Monomers[1] Pr (ml.) | Monomers[1] BD (ml.) | Diluent, toluene (ml.) | Catalysts[2] CrO₂Cl₂ (ml.) | Catalysts[2] VOCl₃ soln. (ml.) | Catalysts[2] Organo-aluminum soln. (ml.) | Reaction conditions Temp. (°C.) | Reaction conditions Time (hr.) | Alternating copolymer[3] Yield (g.) | Alternating copolymer[3] (η) (dl/g.) | Alternating copolymer[3] Tg (°C.) |
|---|---|---|---|---|---|---|---|---|---|---|---|
| 7 | 2 | 2 | 3 | 0.084 | 1.05 | AlEt₃ (2.62) | −30 | 18 | 1.45 | 0.1 | −75 |
| 8 | 2 | 2 | 0.5 | 0.084 | 1.05 | AlEt₃ (5.24) | −30 | 18 | 1.16 |  |  |
| 9 | 2 | 2 | 3 | 0.084 | 1.05 | AliBu₃ (2.62) | −30 | 18 | 1.73 |  |  |
| 10 | 2 | 2 | 3 | 0.084 | 1.05 | AlEt₂Cl (0.84) | −30 | 0.5 | 0.65 |  |  |

[1] Pr: liquid propylene; BD: liquid butadiene.
[2] VOCl₃ soln.: 1 molar vanadium (V) oxychloride solution in toluene; AlEt₃: 1 molar triethylaluminum solution in toluene; AliBu₃: 1 molar triisobutylaluminum solution in toluene; AlEt₂Cl: 5 molar diethylaluminum monochloride solution in toluene.
[3] (η): intrinsic viscosity in chloroform at 30° C; Tg: glass transition temperature.
NOTE.—Extraction process: Examples Nos. 7, 8, and 10; methyl ethyl ketone soluble fraction was collected as an alternating copolymer, Example No. 9; diethyl ether soluble fraction was collected as an alternating copolymer.

TABLE 5

| Ex. No. | Monomers[1] Pr (ml.) | Monomers[1] BD (ml.) | Diluent, toluene (ml.) | Catalysts[2] VOCl₃ soln. (ml.) | Catalysts[2] Organo-aluminum soln. (ml.) | Reaction conditions Temp. (°C.) | Reaction conditions Time (hr.) | Alternating copolymer[3] Yield (g.) | Alternating copolymer[3] [η] (dl/g.) | Alternating copolymer[3] Tg (°C.) |
|---|---|---|---|---|---|---|---|---|---|---|
| 11 | 2 | 2 | 3 | 1.05 | AlEt₃ (2.62) | −30 | 18 | 0.90 |  |  |
| 12 | 2 | 2 | 3 | 1.05 | AliBu₃ (2.62) | −30 | 18 | 1.20 | 0.1 | −75 |
| 13 | 2 | 2 | 3 | 1.05 | AlEt₂Cl (0.84) | −30 | 45 | 0.15 |  |  |

[1] Pr: liquid propylene; BD: liquid butadiene.
[2] VOCl₃ soln.: 1 molar vanadium (V) oxychloride solution in toluene; AlEt₃: 1 molar triethylaluminum solution in toluene; AliBu₃: 1 molar triisobutylaluminum solution in toluene; AlEt₂Cl: 5 molar diethylaluminum monochloride solution in toluene.
[3] [η]: intrinsic viscosity in chloroform at 30° C.; Tg: glass transition temperature.
NOTE.—Extraction process: Example Nos. 11, 13; methyl ethyl ketone soluble fraction was collected as an alternating copolymer, Example No. 12; diethyl ether soluble fraction was collected as an alternating copolymer

TABLE 6

| Example No. | Monomers[1] 1-Bu (ml.) | Monomers[1] BD (ml.) | Diluent, toluene (ml.) | Catalysts[2] CrO₂Cl₂ (ml.) | Catalysts[2] VOCl₃ soln. (ml.) | Catalysts[2] Organo-aluminum soln. (ml.) | Reaction conditions Temp. (°C.) | Reaction conditions Time (hr.) | Alternating copolymer[3] Yield (g.) | Alternating copolymer[3] [η] (dl/g.) | Alternating copolymer[3] Tg (°C.) |
|---|---|---|---|---|---|---|---|---|---|---|---|
| 14 | 2.5 | 2 | 5 | 0.084 | 1.05 | AliBu₃ (2.62) | −30 | 15.5 | 1.61 | 0.1 | −74 |
| 15 | 2.5 | 2 | 5 | 0.084 | 1.05 | AlEt₃ (2.62) | −30 | 15.5 | 1.65 |  |  |
| 16 | 2.5 | 2 | 7 | 0.084 | 1.05 | AlEt₂Cl (0.84) | −30 | 15.5 | 0.89 |  |  |

[1] 1-Bu: liquid 1-butene; BD: liquid butadiene.
[2] VOCl₃ soln.: 1 molar vanadium (V) oxychloride solution in toluene; AliBu₃: 1 molar triisobutylaluminum solution in toluene; AlEt₃: 1 molar triethylaluminum solution in toluene; AlEt₂Cl: 5 molar solution of diethylaluminum monochloride in toluene.
[3] [η]: intrinsic viscosity in chloroform at 30° C.; Tg: glass transition temperatutre.
NOTE.—Extraction process: Example No. 14; diethyl ether soluble fraction was collected as an alternating copolymer, Examples Nos. 15, 16; methyl ethyl ketone soluble fraction was collected as an alternating copolymer.

TABLE 7

| Example No. | Monomers[1] 1-Bu (ml.) | Monomers[1] BD (ml.) | Diluent, toluene (ml.) | B.P.O. soln. (ml.) | Catalysts[2] VOCl₃ soln. (ml.) | Catalysts[2] Organo-aluminum soln. (ml.) | Reaction conditions Temp. (°C.) | Reaction conditions Time (hr.) | Alternating copolymer[2] Yield (g.) | Alternating copolymer[2] [η] (dl/g.) | Alternating copolymer[2] Tg (°C.) |
|---|---|---|---|---|---|---|---|---|---|---|---|
| 17 | 2.5 | 2 | 3 | 2.10 | 1.05 | AliBu₃ (2.62) | −30 | 42 | 1.42 | 0.1 | −75 |
| 18 | 2.5 | 2 | 3 | 2.10 | 1.05 | AlEt₃ (2.62) | −30 | 42 | 0.38 |  |  |
| 19 | 2.5 | 2 | 5 | 2.10 | 1.05 | AlEt₂Cl (0.84) | −30 | 42 | 0.12 |  |  |

[1] 1-Bu: liquid 1-butene; BD: liquid butadiene.
[2] B.P.O. soln.: 0.5 molar benzoyl peroxide solution in toluene; VOCl₃ soln.: 1 molar vanadium (V) oxychloride solution in toluene; AliBu₃: 1 molar triisobutylaluminum solution in toluene; AlEt₃: 1 molar triethylaluminum solution in toluene.
[3] [η]: intrinsic viscosity in chloroform at 30° C.; Tg: glass transition temperature.
NOTE.—Extraction process: Example No. 17; diethyl ether soluble fraction was collected as an alternating copolymer, Examples Nos. 18, 19; methyl ethyl ketone soluble fraction was collected as an alternating copolymer.

TABLE 8

| Ex. No. | Monomers[1] | | Diluent toluene (ml.) | Catalysts[2] | | Reaction conditions | | Alternating copolymer[3] | | |
|---|---|---|---|---|---|---|---|---|---|---|
| | 1-Bu (ml.) | BD (ml.) | | VOCl₃ soln. (ml.) | Organo-aluminum soln. (ml.) | Temp. (°C.) | Time (hr.) | Yield (g.) | [η] (dl/g.) | Tg (°C.) |
| 20 | 2.5 | 2 | 5 | 1.05 | AliBu₃ (2.62) | −30 | 15.5 | 1.48 | 0.1 | −76 |
| 21 | 2.5 | 2 | 5 | 1.05 | AlEt₃ (2.62) | −30 | 15.5 | 1.46 | | |
| 22 | 2.5 | 2 | 5 | 1.05 | AlEt₂Cl (0.84) | −30 | 15.5 | 0.45 | | |

[1] 1-Bu: liquid 1-butene; BD: liquid butadiene.
[2] VOCl₃ soln.: 1 molar vanadium (V) oxychloride solution in toluene; AliBu₃: 1 molar triisobutylaluminum solution in toluene; AlEt₃: 1 molar triethylaluminum solution in toluene; AlEt₂Cl: 5 molar diethylaluminum monochloride solution in toluene.
[3] [η]: intrinsic viscosity in chloroform at 30° C.; Tg: glass transition temperature.
NOTE.—Extraction process: Example No. 20; diethyl ether soluble fraction was collected as an alternating copolymer, Examples Nos. 21, 22; methyl ethyl ketone soluble fraction was collected as an alternating copolymer.

TABLE 9

| Example No. | Monomers[1] | | Diluent, toluene (ml.) | Catalysts[2] | | | Reaction conditions | | Alternating copolymer[3] | | |
|---|---|---|---|---|---|---|---|---|---|---|---|
| | Sty (ml.) | BD (ml.) | | B.P.O. soln. or CrO₂Cl₂ (ml.) | VOCl₃ soln. (ml.) | AliBu₃ soln. (ml.) | Temp. (°C.) | Time (hr.) | Yield (g.) | [η] (dl/g.) | Tg (°C.) |
| 23 | 3 | 2 | 6 | B.P.O. soln. (2.1) | 1.02 | 2.6 | −30 | 45 | 0.75 | 0.3 | −26 |
| 24 | 3 | 2 | 7 | | 1.05 | 2.6 | −30 | 17 | 0.46 | | |
| 25 | 3 | 2 | 7 | CrO₂Cl₂ (0.08) | 1.05 | 2.6 | −30 | 17 | 1.00 | 0.4 | −28 |

[1] Sty: styrene; BD: liquid butadiene.
[2] B.P.O. soln.: 0.5 molar benzoyl peroxide solution in toluene; VOCl₃ soln.: 1 molar vanadium (V) oxychloride solution in toluene; AliBu₃ soln.: 1 molar triisobutylaluminum solution in toluene.
[3] [η]: intrinsic viscosity in chloroform at 30° C; Tg: glass transition tempreature.

TABLE 10

| Example No. | Monomers[1] | | Diluent, toluene (ml.) | Catalysts[2] | | | Reaction conditions | | Alternating copolymer[3] | | |
|---|---|---|---|---|---|---|---|---|---|---|---|
| | Pr (ml.) | BD (ml.) | | VCl₄ soln. (ml.) | Organoaluminum soln. (ml.) | B.P.O. soln. (ml.) | Temp. (°C.) | Time (hr.) | Yield (g.) | [η] (dl/g.) | Tg (°C.) |
| 26 | 2 | 2 | 2.5 | 1.05 | AliBu₃ (2.62) | 2.10 | −30 | 96 | 0.88 | 0.1 | −75 |
| 27 | 2 | 2 | 2.5 | 1.05 | AlEt₃ (2.62) | 2.10 | −30 | 96 | 0.40 | | |
| 28 | 2 | 2 | 4.5 | 1.05 | AlEt₂Cl (0.84) | 2.10 | −30 | 96 | 0.01 | | |

[1] Pr: liquid propylene; BD: liquid butadiene.
[2] VCl₄ soln.: 1 molar vanadium (IV) chloride solution in toluene; Organoaluminum soln.: AliBu₃=1 molar triisobutylaluminum solution in toluene, AlEt₃=1 molar triethylaluminum solution in toluene, AlEt₂Cl=5 molar diethylaluminum monochloride solution in toluene.
[3] [η]: intrinsic viscosity in chloroform at 30° C.; Tg: glass transition temperature.
NOTE.—Extraction process: Examples Nos. 27, 28; methyl ethyl ketone soluble fraction was collected as an alternating copolymer, Example No. 26; diethyl ether soluble fraction was collected as an alternating copolymer.

TABLE 11

| Example No. | Monomers[1] | | Diluent, toluene (ml.) | Catalysts[4] | | | Reaction conditions | | Alternating copolymer[3] | | |
|---|---|---|---|---|---|---|---|---|---|---|---|
| | Pr (ml.) | BD (ml.) | | CrO₂Cl₂ (ml.) | VCl₄ (ml.) | Organoaluminum soln. (ml.) | Temp. (°C.) | Time (hr.) | Yield (g.) | [η] (dl/g.) | Tg (°C.) |
| 29 | 2 | 2 | 6 | 0.084 | 0.11 | AlEt₃ (2.62) | −30 | 15.5 | 1.49 | 0.1 | −75 |
| 30 | 2 | 2 | 6 | 0.084 | 0.11 | AliBu₃ (2.62) | −30 | 15.5 | 1.45 | | |
| 31 | 2 | 2 | 8 | 0.084 | 0.11 | AlEt₂Cl (0.84) | −30 | 15.5 | 0.23 | | |

[1] Pr: liquid propylene; BD: liquid butadiene.
[2] Organoaluminum soln.: AlEt₃=1 molar triethylaluminum solution in toluene, AliBu₃=1 molar triisobutylaluminum solution in toluene, AlEt₂Cl=5 molar diethylaluminum monochloride solution in toluene.
[3] [η]: intrinsic viscosity in chloroform at 30° C.; Tg glass transition temperature.
NOTE.—Extraction process: Examples Nos. 29, 31; methyl ethyl ketone soluble fraction was collected as an alternating copolymer, Example No. 30; diethyl ether soluble fraction was collected as an alternating copolymer.

TABLE 12

| Ex. No. | Monomers[1] | | Diluent, toluene (ml.) | Catalysts[2] | | Reaction conditions | | Alternating copolymer[3] | | |
|---|---|---|---|---|---|---|---|---|---|---|
| | α-Olefine (ml.) | BD (ml.) | | VCl₄ soln. (ml.) | Organoaluminum soln. (ml.) | Temp. (°C.) | Time (hr.) | Yield (g.) | (η) (dl/g.) | Tg (°C.) |
| 32 | Pr (2) | 2 | 6 | 0.11 | AlEt₃ (2.62) | −30 | 15.5 | 0.03 | | |
| 33 | Pr (2) | 2 | 6 | 0.11 | AliBu₃ (2.62) | −30 | 15.5 | 0.05 | | |
| 34 | 1-Bu (2.5) | 2 | 6 | 0.11 | AlEt₂ (2.62) | −30 | 17 | 1.01 | 0.1 | −76 |

[1] Pr: liquid propylene; 1-Bu: liquid 1-butene; BD: liquid butadiene.
[2] Organoaluminum soln.: AlEt₃=1 molar triethylaluminum solution in toluene, AliBu₃=1 molar triisobutylaluminum solution in toluene.
[3] [η]: intrinsic viscosity in chloroform at 30° C.; Tg: glass transition temperature.
NOTE.—Extraction process: Examples Nos. 32, 34; methyl ethyl ketone soluble fraction was collected as an alternating copolymer, Example No. 33; diethyl ether soluble fraction was collected as an alternating copolymer.

TABLE 13

| Example No. | Monomers[1] | | Diluent, toluene (ml.) | Catalysts[2] | | | Reaction conditions | | Alternating copolymer[3] | | |
|---|---|---|---|---|---|---|---|---|---|---|---|
| | 1-Bu (ml.) | BD (ml.) | | $CrO_2Cl_2$ (ml.) | $VCl_4$ (ml.) | Organoaluminum soln. (ml.) | Temp. (°C.) | Time (hr.) | Yield (g.) | $[\eta]$ (dl/g.) | Tg (°C.) |
| 35 | 2.5 | 2 | 6 | 0.084 | 0.11 | $AlBu_3$ (2.62) | −30 | 17 | 1.49 | 0.1 | −75 |
| 36 | 2.5 | 2 | 6 | 0.084 | 0.11 | $AlEt_3$ (2.62) | −30 | 17 | 1.21 | | |
| 37 | 2.5 | 2 | 8 | 0.084 | 0.11 | $AlEt_2Cl$ (0.84) | −30 | 17 | 0.65 | | |

[1] 1-Bu: liquid 1-butene; BD: liquid butadiene.
[2] Organoaluminum soln.: $AlBu_3$=1 molar triisobutylaluminum solution in toluene, $AlEt_3$=1 molar triethylaluminum solution in toluene, $AlEt_2Cl$=5 molar diethylaluminum monochloride solution in toluene.
[3] $[\eta]$: intrinsic viscosity in chloroform at 30° C.; Tg: glass transition temperature.
NOTE.—Extraction process: Examples Nos. 36, 37; methyl ethyl ketone soluble fraction was collected as an alternating copolymer, Example No. 35; diethyl ether soluble fraction was collected as an alternating copolymer.

TABLE 14

| Example No. | Monomers[1] | | Diluent, toluene (ml.) | Catalysts[2] | | Reaction conditions | | Alternating copolymer[3] | | |
|---|---|---|---|---|---|---|---|---|---|---|
| | 1-Bu (ml.) | BD (ml.) | | $VCl_4$ (ml.) | Organoaluminum soln. (ml.) | Temp. (°C.) | Time (hr.) | Yield (g.) | $[\eta]$ (dl/g.) | Tg (°C.) |
| 38 | 2.5 | 2 | 6 | 0.1 | $AlBu_3$ (2.6) | −30 | 19 | 1.10 | 0.1 | −74 |
| 39 | 2.5 | 2 | 6 | 0.1 | $AlEt_3$ (2.6) | −30 | 19 | 0.45 | | |
| 40 | 2.5 | 2 | 8 | 0.1 | $AlEt_2Cl$ (0.84) | −30 | 19 | 0.02 | | |

[1] 1-Bu: liquid 1-butene; BD: liquid butadiene.
[2] Organoaluminum soln.: $AlBu_3$=1 molar triisobutylaluminum solution in toluene, $AlEt_3$=1 molar triethylaluminum solution in toluene, $AlEt_2Cl$=5 molar diethylaluminum solution in toluene.
[3] $[\eta]$: intrinsic viscosity in chloroform at 30° C.; Tg: glass transition temperature.
NOTE.—Extraction process: Examples Nos. 39, 40; methyl ethyl ketone soluble fraction was collected as an alternating copolymer, Example No. 38; diethyl ether soluble fraction was collected as an alternating copolymer.

TABLE 15

| Example No. | Monomers[1] | | Diluent, toluene (ml.) | Catalysts[2] | | | Reaction conditions | | Alternating copolymer[3] | | |
|---|---|---|---|---|---|---|---|---|---|---|---|
| | 1-Bu (ml.) | BD (ml.) | | B.P.O. soln. (ml.) | $VCl_4$ (ml.) | Organoaluminum soln. (ml.) | Temp. (°C.) | Time (hr.) | Yield (g.) | $[\eta]$ (dl/g.) | Tg (°C.) |
| 41 | 2.5 | 2 | 4 | 2.1 | 0.1 | $AlBu_3$ (2.6) | −30 | 19 | 1.86 | 0.1 | −75 |
| 42 | 2.5 | 2 | 4 | 2.1 | 0.1 | $AlEt_3$ (2.6) | −30 | 19 | 0.53 | | |
| 43 | 2.5 | 2 | 6 | 2.1 | 0.1 | $AlEt_2Cl$ (0.84) | −30 | 19 | 0.14 | | |

[1] 1-Bu: liquid 1-butene; BD: liquid butadiene.
[2] B.P.O. soln.: 0.5 molar benzoyl peroxide solution in toluene; organoaluminum soln.: $AlBu_3$=1 molar triisobutylaluminum solution in toluene, $AlEt_3$=1 molar triethylaluminum solution in toluene, $AlEt_2Cl$=5 molar diethylaluminum monochloride solution in toluene.
[3] $[\eta]$: intrinsic viscosity in chloroform at 30° C.; Tg: glass transition temperature.
NOTE.—Extraction process: Examples Nos. 42, 43; methyl ethyl ketone soluble fraction was collected as an alternating copolymer, Example No. 41; diethyl ether soluble fraction was collected as an alternating copolymer.

TABLE 16

| Example No. | Monomers[1] | | Diluent, toluene (ml.) | Catalysts[2] | | | Reaction conditions | | Alternating copolymer[3] | | |
|---|---|---|---|---|---|---|---|---|---|---|---|
| | α-Olefine (ml.) | BD (ml.) | | B.P.O. soln. (ml.) | $VCl_4$ (ml.) | $AlBu_3$ soln. (ml.) | Temp. (°C.) | Time (hr.) | Yield (g.) | $[\eta]$ (dl/g.) | Tg (°C.) |
| 44 | 1-P (2.9) | 2 | 6 | 2.1 | 0.1 | 2.6 | −30 | 39 | 1.06 | 0.1 | −74 |
| 45 | 4-M-1-P (3.3) | 2 | 6 | 2.1 | 0.1 | 2.6 | −30 | 39 | 0.73 | 0.1 | −58 |
| 46 | 1-H (3.3) | 2 | 6 | 2.1 | 0.1 | 2.6 | −30 | 39 | 0.87 | 0.1 | −76 |

[1] 1-P: liquid 1-pentene; 4-M-1-P: liquid 4-methyl-1-pentene; 1-H: 1-hexene; BD: liquid butadiene.
[2] B.P.O. soln.: 0.5 molar benzoyl peroxide solution in toluene; $AlBu_3$ soln.: 1 molar triisobutylaluminum solution in toluene.
[3] $[\eta]$: intrinsic viscosity in chloroform at 30° C. Tg: glass transition temperature.

TABLE 17

| Example No. | Monomers[1] | | Diluent, toluene (ml.) | Catalysts[2] | | | Reaction conditions | | Alternating copolymer[3] | | |
|---|---|---|---|---|---|---|---|---|---|---|---|
| | Sty (ml.) | BD (ml.) | | B.P.O. soln. or $CrO_2Cl_2$ (ml.) | $VCl_4$ (ml.) | $AlBu_4$ soln. (ml.) | Temp. (°C.) | Time (hr.) | Yield (g.) | $[\eta]$ (dl/g.) | Tg (°C.) |
| 47 | 3 | 2 | 6 | B.P.O. soln. (2.1) | 0.1 | 2.6 | −30 | 45 | 0.96 | 0.4 | −28 |
| 48 | 3 | 2 | 8 | | 0.11 | 2.6 | −30 | 17 | 0.42 | | |
| 49 | 3 | 2 | 8 | $CrO_2Cl_2$ (0.08) | 0.11 | 2.6 | −30 | 17 | 0.55 | 0.4 | −27) |

[1] Sty: styrene; BD: liquid butadiene.
[2] B.P.O. soln.: 0.5 molar benzoyl peroxide solution in toluene; $AlBu_3$ soln.: 1 molar triisobutylaluminum solution in toluene.
[3] $[\eta]$: intrinsic viscosity in chloroform at 30° C.; Tg: glass transition temperature.

What is claimed is:

1. A 1:1 copolymer of butadiene and an alpha-olefin having alternating butadiene and alpha-olefin units, said alpha-olefin having the general formula $CH_2=CHR$ wherein R is a $C_1$ to $C_4$ normal or branched chain alkyl group or a phenyl group, said copolymer having an intrinsic viscosity greater than 0.1 dl./g. in chloroform at 30° C. when R is phenyl and having an intrinsic viscosity not greater than 0.1 dl./g. in chloroform at 30° C. when R is alkyl.

2. An alternating copolymer of claim 1, wherein said alpha-olefin is styrene.

3. An alternating copolymer of claim 1, wherein R is an alkyl group.

4. An alternating copolymer of claim 1 having a glass transition temperature from about −26° C. to about −78° C.

5. A process for preparing an alternating copolymer of claim 1, which comprises contacting butadiene and the alpha-olefin in liquid phase at a temperature within the range from −100° C. to +50° C. in the presence of a hydrocarbon diluent with a catalyst selected from the group consisting of (A) and (B) and (A), (B) and (C), wherein (A) is an organoaluminum compound having the formula $AlR_nCl_{3-n}$ wherein R is a hydrocarbon radical radical selected from the group consisting of an alkyl radical, an aryl radical and a cycloalkyl radical and n is 2 or 3, (B) is vanadium (IV) chloride or vanadium (V) oxychloride, and (C) is an organic peroxide or chromyl (VI) oxychloride, wherein the molar ratio of said organoaluminum compound to said vanadium compound is higher than 0.5 (Al/V>0.5) and the molar ratio of butadiene to said alpha-olefin in the initial monomer composition is within the range of from 20:80 to 80:20.

6. A process of claim 5 wherein said molar ratio of butadiene to said alpha-olefin in the initial monomer composition is substantially 50:50.

7. A process of claim 5 wherein (C) is an organic peroxide.

8. A process of claim 7 wherein said molar ratio of butadiene to said alpha-olefin in the initial monomer composition is substantially 50:50.

9. A process of claim 5 wherein (C) is chromium (VI) oxychloride.

10. A process of claim 9 wherein said molar ratio of butadiene to said alpha-olefin in the initial monomer composition is substantially 50:50.

References Cited

UNITED STATES PATENTS

| | | | |
|---|---|---|---|
| 3,496,154 | 2/1970 | Wofford | 260—84.7 |
| 3,506,632 | 4/1970 | Henderson | 260—85.3 |
| 3,317,496 | 5/1967 | Natta et al. | 260—88.2 E |
| 3,407,185 | 10/1968 | Natta et al. | 260—85.3 |
| 3,424,734 | 1/1969 | Schleimer et al. | 260—85.3 |

JOSEPH L. SCHOFER, Primary Examiner

R. A. GAITHER, Assistant Examiner

U.S. Cl. X.R.

260—82.1, 88.2 E, 878